(No Model.)
I. H. HENLEY.
FODDER TYING DEVICE.
No. 525,417. Patented Sept. 4, 1894.
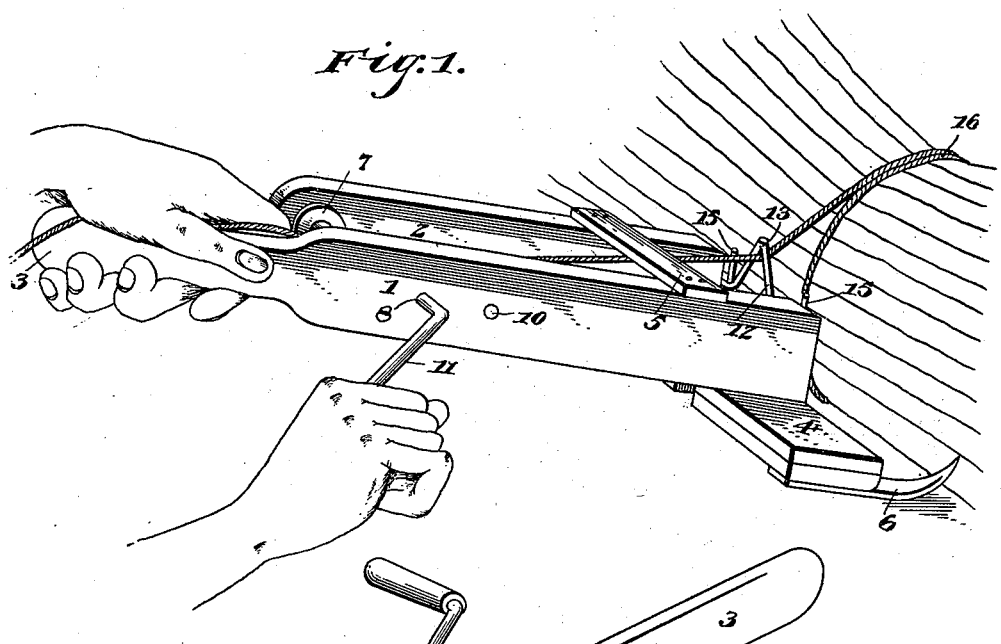
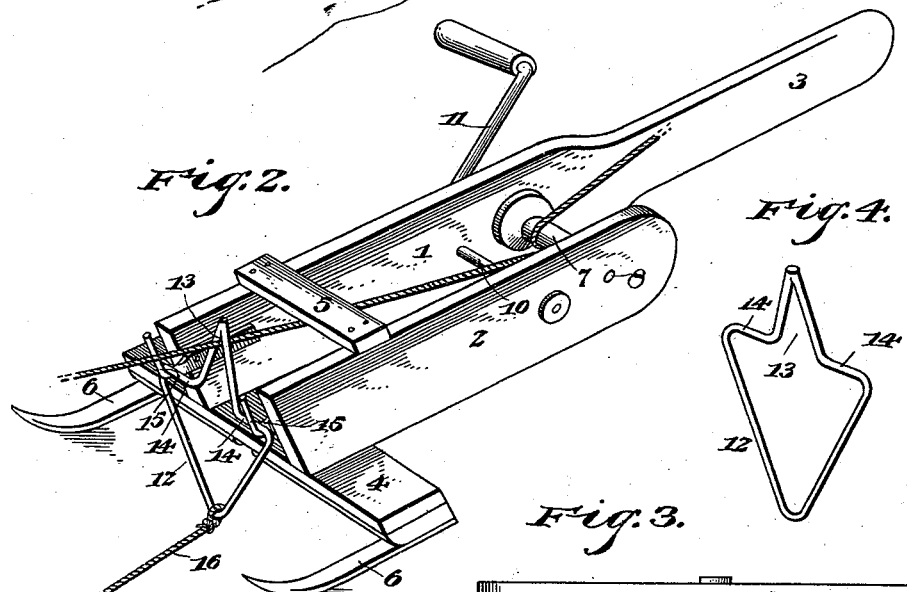
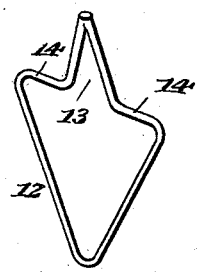
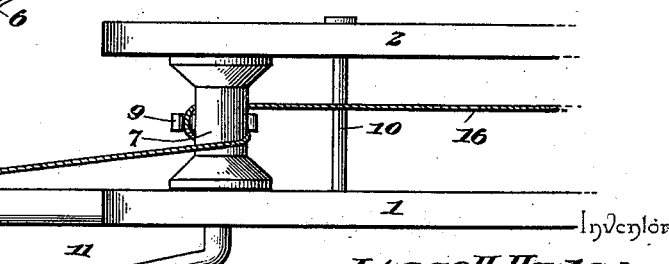
Witnesses
P. S. Ober
Inventor
Isaac H. Henley,
By his Attorneys.
C. A. Snow & Co.

UNITED STATES PATENT OFFICE.

ISAAC H. HENLEY, OF STRAUGHN, INDIANA.

FODDER-TYING DEVICE.

SPECIFICATION forming part of Letters Patent No. 525,417, dated September 4, 1894.

Application filed March 31, 1894. Serial No. 505,925. (No model.)

*To all whom it may concern:*

Be it known that I, ISAAC H. HENLEY, a citizen of the United States, residing at Straughn, in the county of Henry and State of Indiana, have invented a new and useful Fodder-Tying Device, of which the following is a specification.

My invention relates to a device for tying fodder, and has for its object to provide a simple, inexpensive, and efficient machine adapted to compress a bundle or shock of fodder preparatory to tying to form compact sheaves for transportation, piling in ricks, &c.

Further objects and advantages of my invention will appear in the following description, and the novel features thereof will be particularly pointed out in the appended claims.

In the drawings: Figure 1 is a perspective view of a device embodying my invention, applied in the operative position to a bundle or shock of fodder. Fig. 2 is a similar view detached from the shock. Fig. 3 is a partial plan view showing the spool or drum and the manner of attaching a bight of the cord thereto. Fig. 4 is a detail view of the holder.

Similar numerals of reference indicate corresponding parts in all the figures of the drawings.

The frame of the device consists of the parallel sides or cheeks 1 and 2, of which the former is extended beyond the rear end of the latter to form a handle 3; a transverse pressure bar 4 connecting and extending at its ends beyond the sides or cheeks, and a brace 5 connecting the sides or cheeks at their upper edges. The pressure-bar 4 is provided at its terminals with the forwardly extending curved fingers 6 which are adapted to engage the fodder during operation and prevent the front end of the frame from becoming engaged with the same.

7 represents a spool or drum having its trunnions 8 mounted in bearings in the sides or cheeks near their rear ends and provided at an intermediate point with a stud or hook 9, and connecting the sides or cheeks in advance of the spool or drum is a transverse rod 10. One trunnion of the spool or drum is extended beyond the side or cheek, and to it is attached the operating crank 11.

In connection with the above construction I employ a holder 12, of substantially triangular shape, which is provided at its base with a tapered extension 13, adapted to receive and clamp the cord as hereinafter explained, and in operation the lateral angles 14 of this holder are engaged with hooks 15 which are arranged on the ends of the sides or cheeks.

To operate the above device, the cord 16 is fastened to the apex of the holder 12 and placed upon the ground and the fodder is arranged thereon; the lateral angles of the holder are engaged with the hooks 15 on the front ends of the sides or cheeks; the free end of the cord is carried through the holder and thence back to the handle; an intermediate part of the cord is engaged with the stud or hook on the spool or drum; after which, the free end of the cord being held in the left hand (which grasps the handle), the crank is turned. When the bundle or shock has been drawn sufficiently tight the machine is raised to a substantially vertical position to cause the free end of the cord to draw into the tapered extension 13 of the holder where it is engaged. The bundle will thus be held while a tie is applied, or the cord which is employed to compress the bundle or shock may be detached from the machine; the loose end of the tie cord should be passed under the tight portion thereof, to prevent it from slipping from the tapered extension of the holder.

It will be understood that the holder 12 may be employed solely as a part of the fodder tying device, and thus remain permanently attached to the cord 16, in which case said cord 16 and holder 12 are employed merely to hold the shock compressed during the application of a tying cord; or said holder may be employed as a part of the tie itself, in which case it is attached as above described to the end of the cord 16, and after the shock has been compressed, said cord is cut between the holder and the machine, thus leaving the holder upon the shock as a means of fastening the ends of the tie, the latter course being preferable.

It will be seen that the device is simple and may be readily manipulated to compress or tie fodder, &c., and it will be understood, furthermore, that various changes in the form, proportion, and minor details of construction may be resorted to without departing from the spirit or sacrificing any of the advantages of the invention.

Having thus described my invention, I claim—

1. In a device of the class described, the combination with a frame, of curved fingers arranged at the front end thereof, and adapted to bear at their extremities against the side of a bundle or shock of fodder, a cord, and means carried by the frame for reeling the same, substantially as specified.

2. In a device of the class described, the combination with a frame provided at its front end with hooks, of a holder provided with lateral angles to engage said hooks, and a tapered extension to engage a cord, a cord secured at one end to the holder and passing at its free end therethrough, and means carried by the frame for reeling the same, substantially as specified.

In testimony that I claim the foregoing as my own I have hereto affixed my signature in the presence of two witnesses.

ISAAC H. HENLEY.

Witnesses:
GEORGE F. GUERIN,
J. L. HOLLAND.